W. Fauntleroy,
Horse-Collar Machine.
Nº 82,100. Patented Sep. 15, 1868.
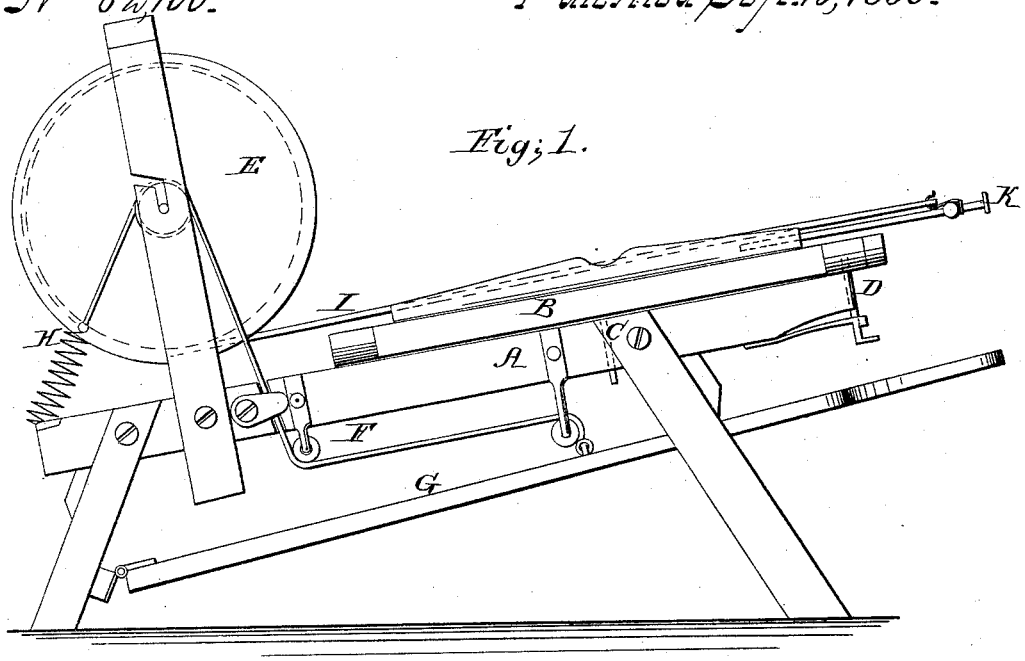
Fig; 1.
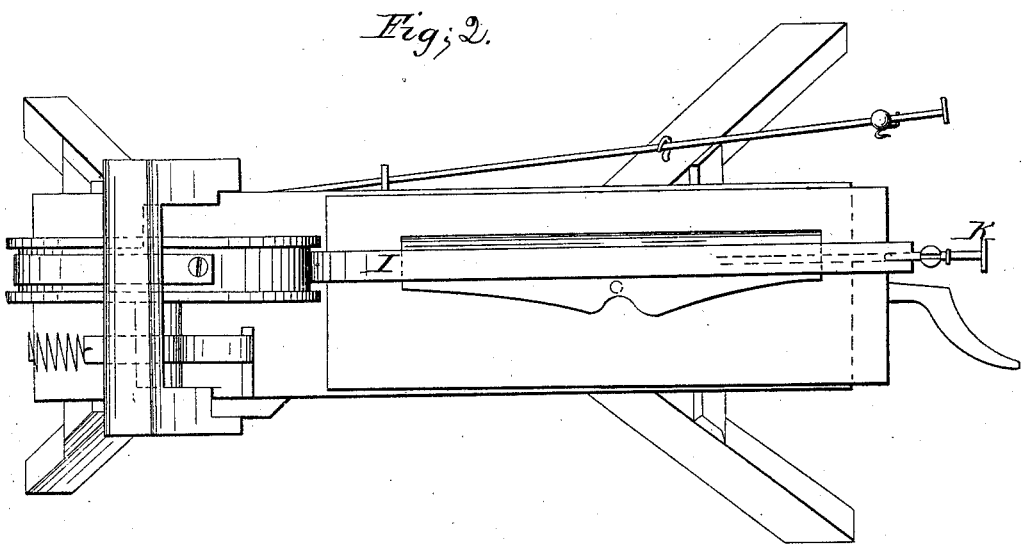
Fig; 2.
Witnesses: Inventor,

United States Patent Office.

WILLIAM FAUNTLEROY, OF NEW HARMONY, INDIANA.

Letters Patent No. 82,100, dated September 15, 1868.

IMPROVED MACHINE FOR STUFFING HORSE-COLLARS.

The Schedule referred to in these Letters Patent and making part of the same:

TO ALL WHOM IT MAY CONCERN:

Be it known that I, WILLIAM FAUNTLEROY, of New Harmony, in the county of Posey, and State of Indiana, have invented a new and useful Improvement in Machines for Stuffing Collars; and I do hereby declare that the following is a full, clear, and exact description thereof, which will enable others skilled in the art to make and use the same, reference being had to the accompanying drawings, forming part of this specification, in which—

Figure 1 represents a side elevation of my improved machine.

Figure 2 represents a plan view of the same.

Similar letters of reference indicate like parts.

The object of this invention is to provide a simple and effective machine for stuffing collars for horses.

It consists of a collar-board pivoted centrally on a suitable bench, whereon the leather portion of the collar is stretched and secured, with both ends open, and a pulley made to operate by a foot-lever, over which a belt works, to which a stuffing-mandrel is connected, which is guided by one hand, while by the other the straw or other filling is fed into the mouth of the collar, and the strap actuates the mandrel to pack the filling. When the collar has been filled at one end to the centre, the collar-board is swung around to present the other end to the operator.

A represents a suitable bench, whereon the collar-board B is pivoted, at C, and provided with a spring-catch, D, to hold it in position.

E represents a pulley arranged in bearings at one end of the bench, and provided with a belt, F, connecting the hub of the same with the front lever, G.

H represents a spring for retracting the pulley, which is provided with a belt, I, to the end of which a stuffing-mandrel, K, is secured.

The collar to be stuffed is fastened upon the collar-board B in any suitable manner, and the material with which they are to be stuffed is presented to the open ends by one hand, while the mandrel, which is held in the other, is drawn into them to pack the stuffing, by the belt I and pulley, the latter being actuated by the foot-lever G. The pulley E may be retracted by the spring H, or the operator may draw it back by the belt I and mandrel.

When one end of the collar has been stuffed, the spring-catch D is disconnected from the collar-board B, and the latter is swung around, so as to present the other end to be operated on.

Having thus described my invention, I claim as new, and desire to secure by Letters Patent—

1. The combination of the collar-board B, pulley E, collar I, and mandrel K, substantially as and for the purpose described.

2. The combination, with the same, of the belt F and treadle G, substantially as and for the purpose described.

WILLIAM FAUNTLEROY.

Witnesses:
ALFRED D. OWEN,
EUGENE S. THRALL.